US006779615B2

(12) United States Patent  
Boyer et al.

(10) Patent No.: US 6,779,615 B2
(45) Date of Patent: Aug. 24, 2004

(54) POWERTRAIN MODULE FOR ZERO TURN RADIUS VEHICLE

(75) Inventors: Scott G. Boyer, Borden, IN (US); Orville R. McDonner, Salem, IN (US); Richard T. Ruebusch, New Albany, IN (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 10/152,055

(22) Filed: May 21, 2002

(65) Prior Publication Data

US 2002/0179341 A1 Dec. 5, 2002

Related U.S. Application Data

(60) Provisional application No. 60/292,349, filed on May 21, 2001.

(51) Int. Cl.[7] .......................... B60K 17/10; B62D 11/12
(52) U.S. Cl. ...................................... 180/6.48; 180/6.66
(58) Field of Search ................................ 180/6.2, 6.23, 180/6.48, 6.66, 374

(56) References Cited

U.S. PATENT DOCUMENTS

| 1,521,458 A | 12/1924 | McCartney |
| 1,521,696 A | 1/1925 | Mansfield |
| 1,765,986 A | 6/1930 | Mackenzie |
| 2,054,877 A | 9/1936 | Eastman |
| 2,612,148 A | 9/1952 | Vincent |
| 2,784,794 A | 3/1957 | Barenyi |
| 2,888,088 A | 5/1959 | Claas et al. |
| 2,924,287 A | 2/1960 | Bramley |
| 3,300,698 A | 1/1967 | Bopp et al. |
| 3,309,943 A | 3/1967 | Kosman et al. |
| 3,748,851 A | 7/1973 | Hause |
| 3,805,641 A | 4/1974 | Hause |

(List continued on next page.)

FOREIGN PATENT DOCUMENTS

| JP | 63106136 A | * 5/1988 | ........... B60K/17/10 |
| JP | 06087340 | 3/1994 | |
| JP | 60-87340 | 3/1994 | |
| WO | WO97/15764 | 5/1997 | |

OTHER PUBLICATIONS

US 4,970,914, 11/1990, Takagi (withdrawn)

Primary Examiner—Kevin Hurley
(74) Attorney, Agent, or Firm—Baker & Daniels

(57) ABSTRACT

A powertrain module for a zero turn radius vehicle, such as a tractor or mower, the powertrain module generally including a structural member or mounting plate to which an engine, a pair of hydrostatic transmission modules, and a pair of axle drive units are attached to form a self-contained powertrain module which may be shipped as a single packaged unit for installation into the zero turn radius implement. The mounting plate provides structural rigidity between the powertrain components attached thereto, and the mounting plate of the powertrain module may be attached directly to the frame of the vehicle, or alternatively, may itself serve as a structural frame member for the vehicle.

31 Claims, 7 Drawing Sheets

U.S. PATENT DOCUMENTS

| | | |
|---|---|---|
| 3,915,030 A | 10/1975 | Ritter |
| 4,146,105 A | 3/1979 | Scag |
| 4,487,006 A | 12/1984 | Scag |
| 4,513,834 A | 4/1985 | Hayashi et al. |
| 4,574,902 A | 3/1986 | Irimajiri |
| 4,738,328 A | 4/1988 | Hayden |
| 4,809,796 A | 3/1989 | Yamaoka et al. |
| 4,920,733 A | 5/1990 | Berrios |
| 4,969,319 A | 11/1990 | Hutchison et al. |
| 5,067,933 A | 11/1991 | Hardesty et al. |
| 5,078,222 A | 1/1992 | Hauser et al. |
| 5,145,019 A | 9/1992 | Sebben et al. |
| 5,186,078 A | 2/1993 | Kameda et al. |
| 5,218,814 A | 6/1993 | Teal et al. |
| 5,238,267 A | 8/1993 | Hutchison et al. |
| 5,809,756 A | 9/1998 | Scag et al. |
| 5,816,034 A | 10/1998 | Peter |
| 5,836,412 A | 11/1998 | Lyles et al. |
| 5,850,886 A | 12/1998 | Kouno et al. |
| 6,026,634 A | 2/2000 | Peter et al. |
| 6,152,247 A | 11/2000 | Sporrer et al. |

\* cited by examiner

POWERTRAIN MODULE FOR ZERO TURN RADIUS VEHICLE

CROSS-REFERENCE TO RELATED APPLICATION

This application claims the benefit under 35 U.S.C. §119 (e) of U.S. Provisional Application No. 60/292,349, filed May 21, 2001.

BACKGROUND OF THE INVENTION

The present invention relates to vehicles such as lawn and garden tractors and riding lawn mowers used in the lawn and garden industry, particularly lawn mowers of the zero turn radius variety which include hydrostatic transaxles and which are steered by controlling the speed and direction of the ground-engaging drive wheels of the mower.

Zero turn radius mowers have long been favored by landscape maintenance professionals for their high level of maneuverability, because such mowers may be turned in place through 360°, allowing faster lawn cutting times. Such mowers are provided with a pair of reversible drive wheels, one on each side of the mower, which are independently controlled. Each wheel is driven by a separate fluid motor, and each motor is driven by a separate, positive displacement fluid pump. Normally, a gear reduction set is provided between the motor and each wheel, by which the speeds of the wheels are reduced, and their output torque increased. An engine, which is typically mounted to the frame of the mower, drives the pumps at constant speed, and the speed and direction of rotation of each wheel motor is individually controlled by altering the displacement of the associated pump and selecting which of two conduits through which fluids may flow from the pump to the motor. Rotation of the drive wheels in opposite directions at common speeds will spin the mower in place relative to the ground, thereby providing a zero turn radius.

A fluid pump and motor pair may be comprised of separate pump and motor units in fluid communication through hydraulic fluid lines. The axle and gear reduction set may include a separate unit attached to the motor unit. A separate pump and motor pair are required for driving each axle, as well as a separate fluid reservoir sump to provide any needed hydraulic fluid to the pump. Space on the mower must also be provided for packaging the reservoir or sump.

It is necessary that the engine and pump positions, and the motor and drive axle positions, be fixed relative to each other. Previous zero turn radius mowers rely on a mower frame, which may be made of heavy gauge sheet steel, plate steel, and/or angle iron, to provide structural rigidity not only between the engine and the pump units, but also between the two wheel motor units. To provide such rigidity, the frame may require substantial bracing and further, such frames must be provided with closely toleranced mounting holes for mounting the engine, as well as the individual pumps, motors, and gear reduction units. Thus, previous zero turn radius motors require a frame which is heavy, rigid, and expensive.

It is known in the art to provide a hydrostatic transmission module, in which a fuel pump and motor pair are located in a common housing. Further, the hydrostatic transmission module and an axle drive assembly may be attached together and shipped as a unit to a tractor or mower manufacturer. Examples of such hydrostatic transmission modules, and hydrostatic transaxles comprising such modules, are described in pending U.S. Pat. No. 6,301,885, and U.S. patent applications Ser. Nos. 09/498,692, filed Feb. 7, 2000, and Ser. No. 09/671,796, filed Sep. 27, 2000, all of which are assigned to Tecumseh Products Company, the disclosures of which are expressly incorporated herein by reference.

However, even though hydrostatic transmission modules and axle drive assemblies are available which are attached together and shipped as a package unit to a tractor or mower manufacturer, the assembly of same to the mower frame, followed by the separate assembly of the engine and the drive linkage components to the mower frame, add further expense and difficulty to manufacturing the mower.

Also known in the art are hydrostatic axle drive units in which a fluid pump and motor pair are be packaged with gear reduction means and a portion of an axle shaft in a common housing. One example of such an axle drive is Model 310-1400 IZT (Integrated Zero-Turn) transaxle manufactured by Hydro-Gear of Sullivan, Ill. One IZT transaxle unit is attached to each side of the mower, and drives one of the two drive wheels.

Separate axle drive units such as the IZT transaxle are rather large, and occupy a considerable amount of space on the mower. Further, separate axle drive units such as the IZT transaxle still rely on the mower frame to provide structural rigidity between the two axle drive units. Thus a heavy, rigid and expensive frame is still required to accommodate a pair of individual axle drive units such as IZT transaxles. Additionally, two of these large axle drive units must be shipped, stored and inventoried by the mower assembler.

What is needed is a compact powertrain module for zero turn radius mowers, which includes existing hydrostatic transmission module and axle drive assembly packages, and which also has built-in structural rigidity to accommodate a lighter and less expensive frame than would otherwise be necessary, thereby facilitating an easier and less costly zero turn radius mower assembly process, and reducing shipping and inventory administration costs for the manufacturers of such mowers.

SUMMARY OF THE INVENTION

The present invention provides a powertrain module for a zero turn radius vehicle, such as a tractor or mower, the powertrain module generally including a mounting plate to which an engine, a pair of hydrostatic transmission modules, and a pair of axle drive units are attached to form a self-contained powertrain module which may be shipped as a single packaged unit to the mower assembler for installation into the zero turn radius implement. The hydrostatic transmissions and axle drive units may be respectively attached to one another as hydrostatic transmission/axle drive unit pairs.

The mounting plate provides structural rigidity between the powertrain components attached thereto. Therefore, the powertrain module may be attached directly to the frame of the implement, or alternatively, the powertrain module may itself serve as a structural frame member for the implement, wherein the mounting plate of the powertrain module cooperates with other structural members of the implement to define the implement frame. The powertrain module may additionally include other components such as brake assemblies, ground-engaging wheels, drive linkage between the engine and the hydrostatic transmissions, or other components, if desired.

Advantageously, the powertrain module may be custom designed and assembled by a powertrain manufacturer to meet the particular specifications of an original equipment manufacturer (OEM), and may be shipped to the OEM as a single packaged unit for easy drop-in assembly into a zero turn radius mower. Further, integration of the engine, hydrostatic transmissions, and axle drive units into a single, self-contained modular assembly obviates the need to separately attach each of the foregoing components to a frame, thereby reducing the cost and complexity of the frame, as well as the difficulty of assembling the implement.

In one form thereof, the present invention provides a self-contained powertrain module including a structural member, an engine attached to the structural member, and first and second hydrostatic transmission modules connected to the structural member. Each hydrostatic transmission module includes a transmission housing, and a rotating fluid pump and a rotatable fluid motor disposed within the housing. Each pump is driven by the engine and is of variable displacement, and each motor is rotated at various speeds and in forward and reverse directions in response to changes in its associated pump's displacement. The inventive module further provides first and second axle drive units connected to the structural member. Each axle drive unit includes a housing and a speed reduction gear train disposed therein. Each speed reduction gear train has an input and an output, the first hydrostatic transmission module motor being operably coupled to the first axle drive unit gear train input, the second hydrostatic transmission module motor being operably coupled to the second axle drive unit gear train input. First and second axles are respectively operably coupled to the first and second gear train outputs, and respectively extend through the first and second axle drive unit housings.

In another form thereof, the present invention provides a zero turn radius vehicle which includes a first frame portion and a second frame portion, the latter including a powertrain module separably attached to the first frame portion. The powertrain module includes a substantially rigid structural member attached to the first frame portion, an engine attached to the structural member, and first and second hydrostatic transmission modules connected to the structural member. Each hydrostatic transmission module includes a transmission housing, and a rotating fluid pump and a rotatable fluid motor disposed therein. Each pump is of variable displacement and is in driving relationship with the engine, and each motor is in fluid engagement with its associated pump, each motor being rotated at various speeds and in forward and reverse directions in response to changes in pump displacement. First and second axle drive units are connected to the structural member, and each axle drive unit includes a housing and a speed reduction gear train disposed within the axle drive unit housing, each the speed reduction gear train having an input and an output. The first hydrostatic transmission module motor is operably coupled to the first axle drive unit gear train input, and the second hydrostatic transmission module motor is operably coupled to the second axle drive unit gear train input. First and second independently rotatable axles are respectively operably coupled to the first and second gear train outputs, and respectively extend through the first and second axle drive unit housings. A ground-engaging wheel is attached to each axle.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
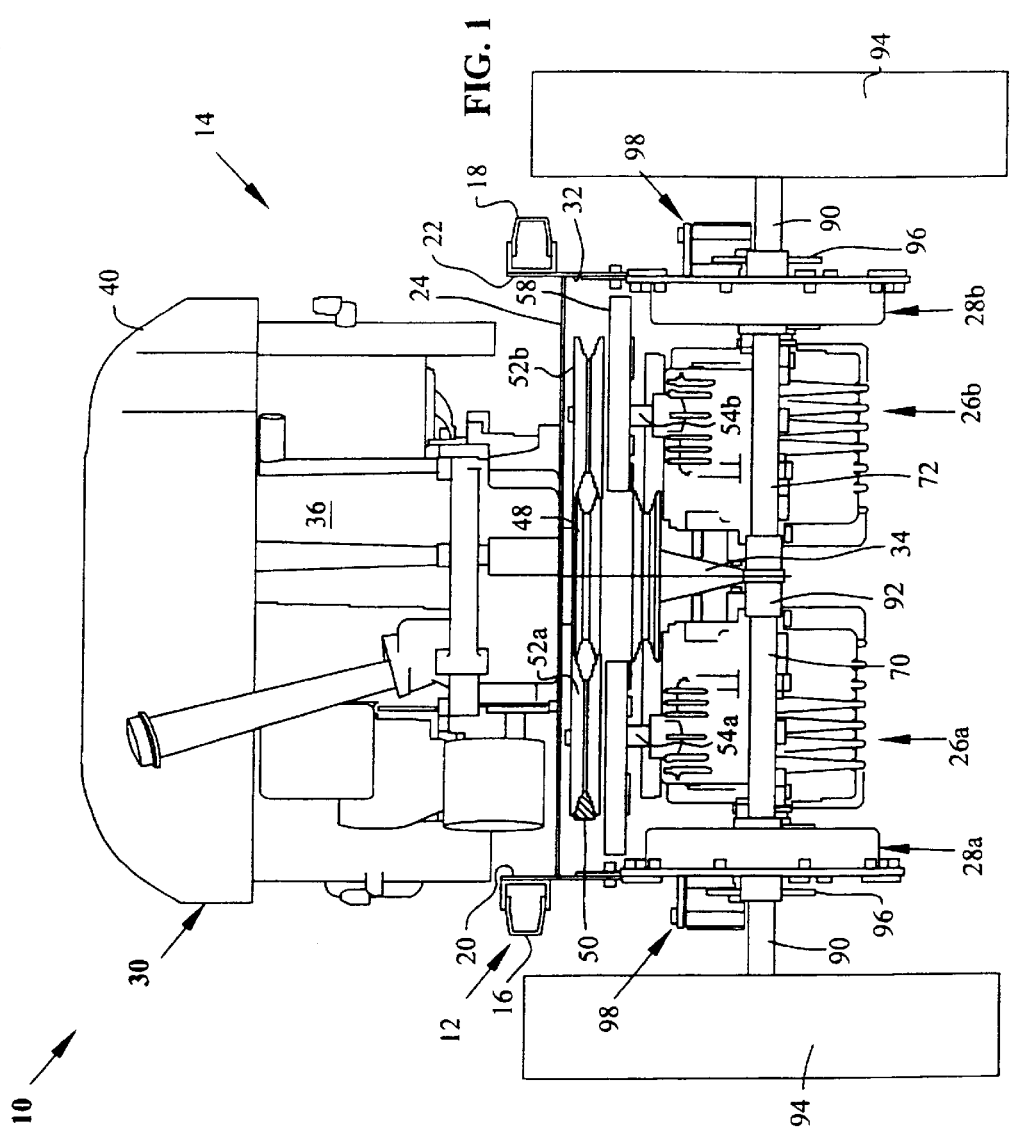
FIG. 1 is a front view of a portion of a zero turn radius mower, including frame members to which a powertrain module in accordance with the present invention is attached, the powertrain module additionally including a pair of ground-engaging wheels attached to the axles thereof.
Figure 4:
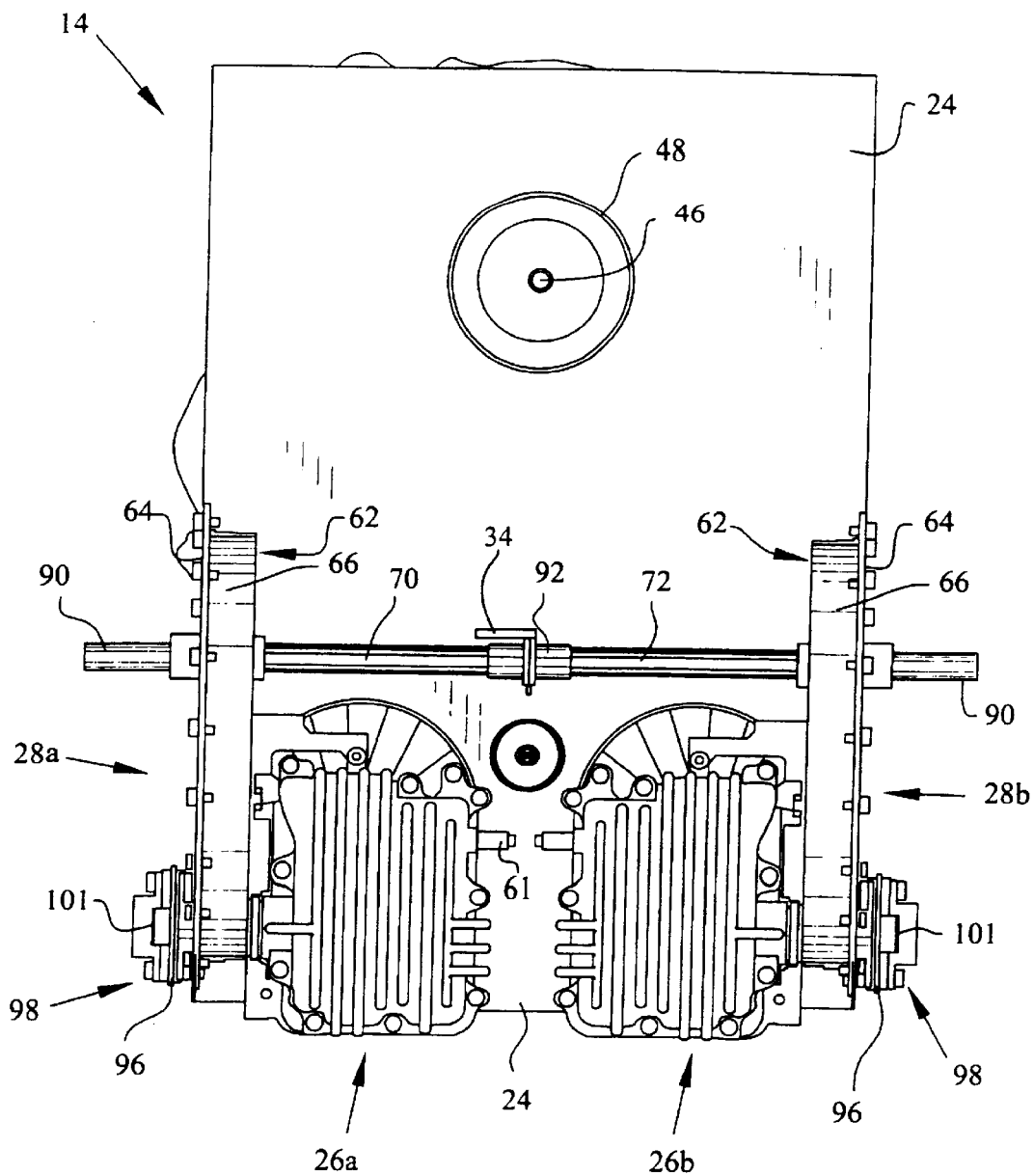
FIG. 4 is a bottom view of the powertrain module of FIG. 2.
Figure 5:
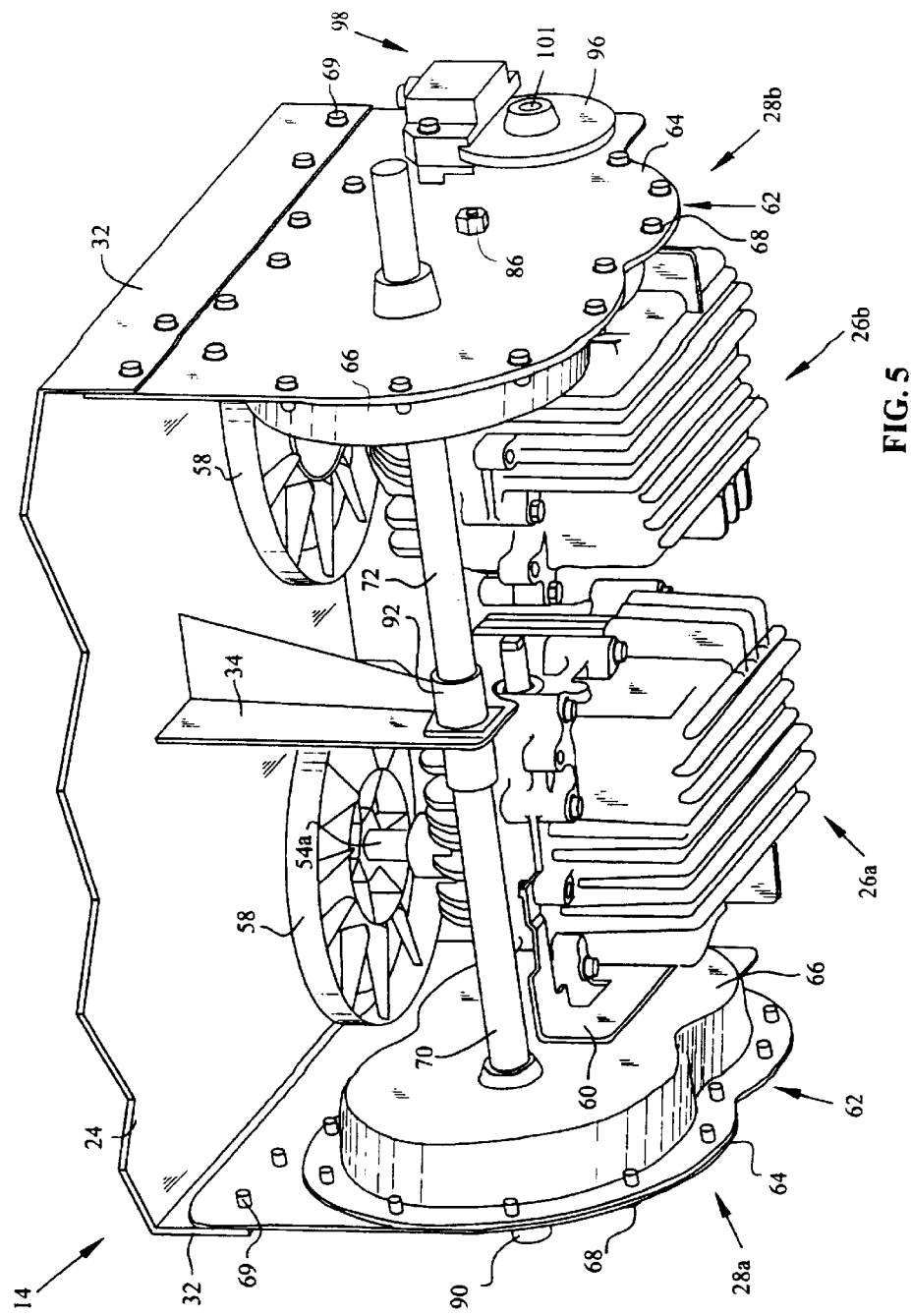
FIG. 5 is a lower, front perspective view of a portion of the powertrain module of FIG. 2, showing the mounting plate to which a pair of mirror-image hydrostatic transmissions and axle drive units are attached, the mounting plate additionally including a support member and bearing independently rotatably supporting the inner free ends of the two axles.
Figure 6:
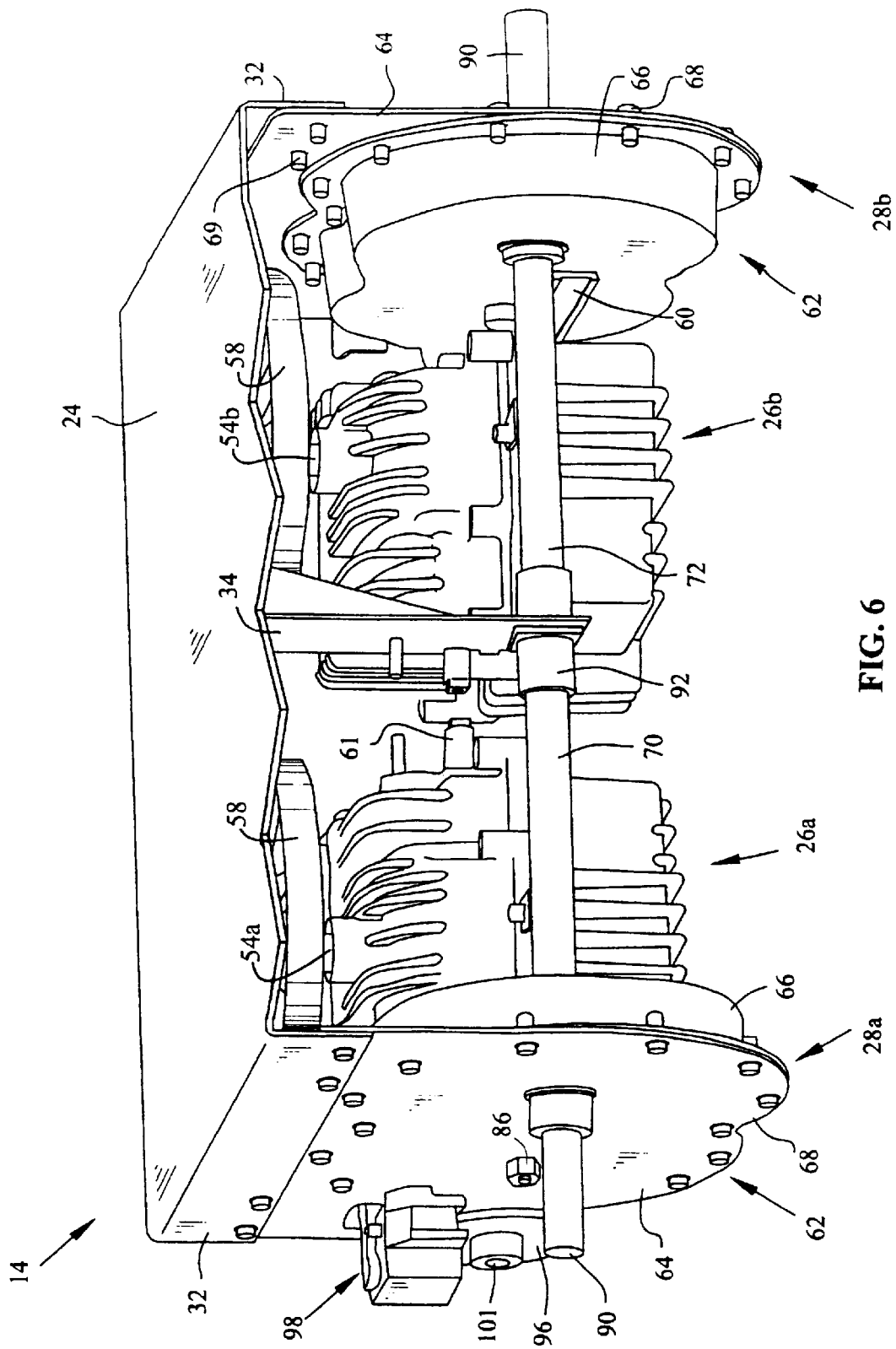
FIG. 6 is an upper, front perspective view of the portion of the powertrain module of FIG. 5.

Referring to FIG. 1, there is shown a zero turn radius vehicle, such as tractor or riding lawnmower 10 including frame 12 to which is attached powertrain module 14. Frame 12 includes left and right C-shaped frame rail members 16, 18 which may be attached to left and right C-shaped brackets 20, 22 which are in turn attached to mounting plate 24 of powertrain module 14. Referring to FIGS. 1–6, powertrain module 14 generally includes mounting plate 24, to which are attached a pair of mirror-image hydrostatic transmission modules 26a, 26b, a pair of mirror-image axle drive units 28a, 28b, and engine 30. As shown in FIGS. 5 and 6, mounting plate 24 may comprise a substantially planar sheet of steel having a pair of depending side portions 32 and bearing support member 34 attached thereto in a suitable manner, such as by welding. Although powertrain module 14 is shown in FIG. 1 attached to frame rail members 16, 18 of mower 10, it should be noted that mounting plate 24 of powertrain module 14 itself provides structural rigidity to frame 12, such that powertrain module 14 itself may alternatively comprise a portion of frame 12 of mower 10.

Figure 2:
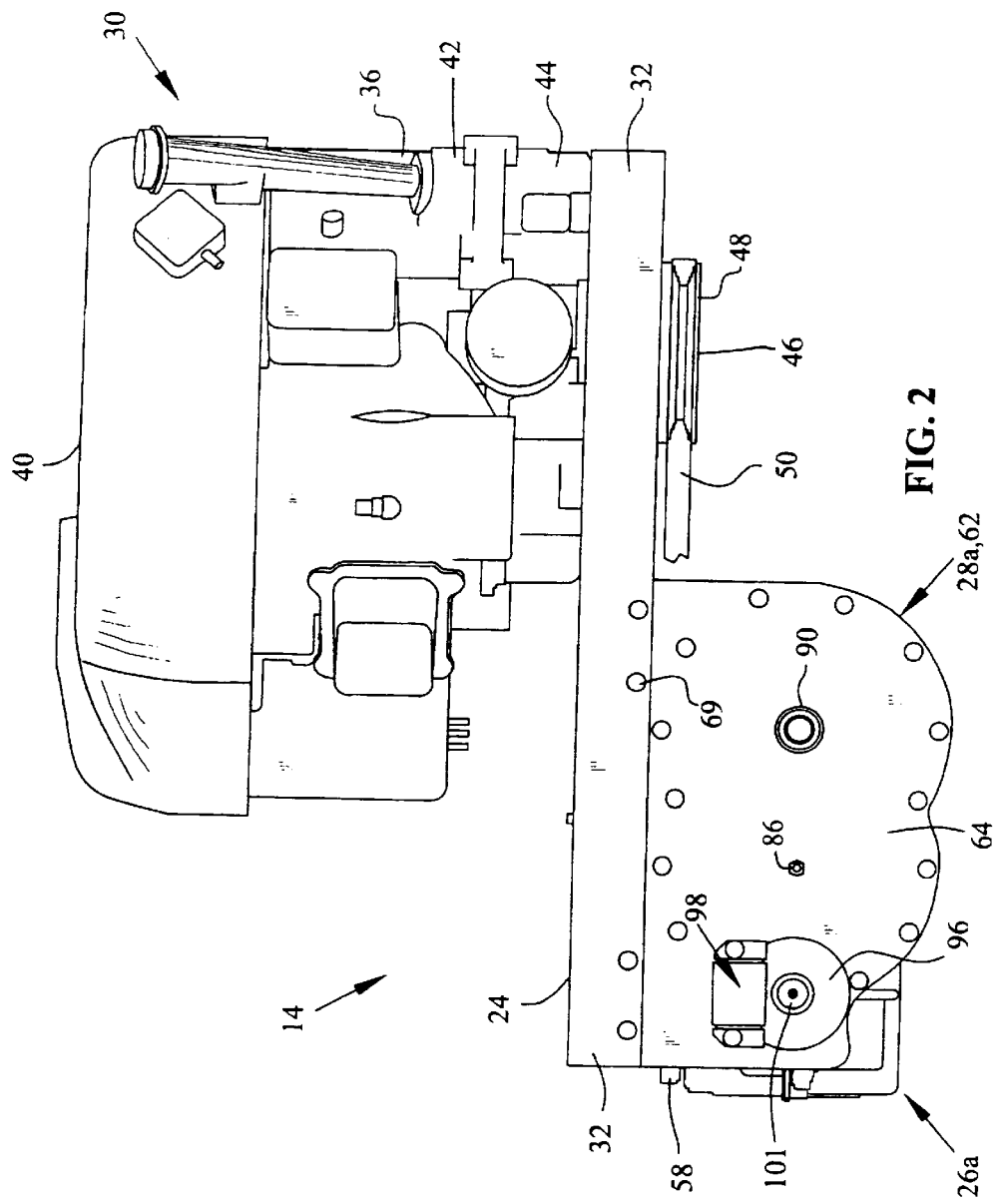
FIG. 2 is a right side view of the powertrain module of the mower of FIG. 1.
Figure 3:
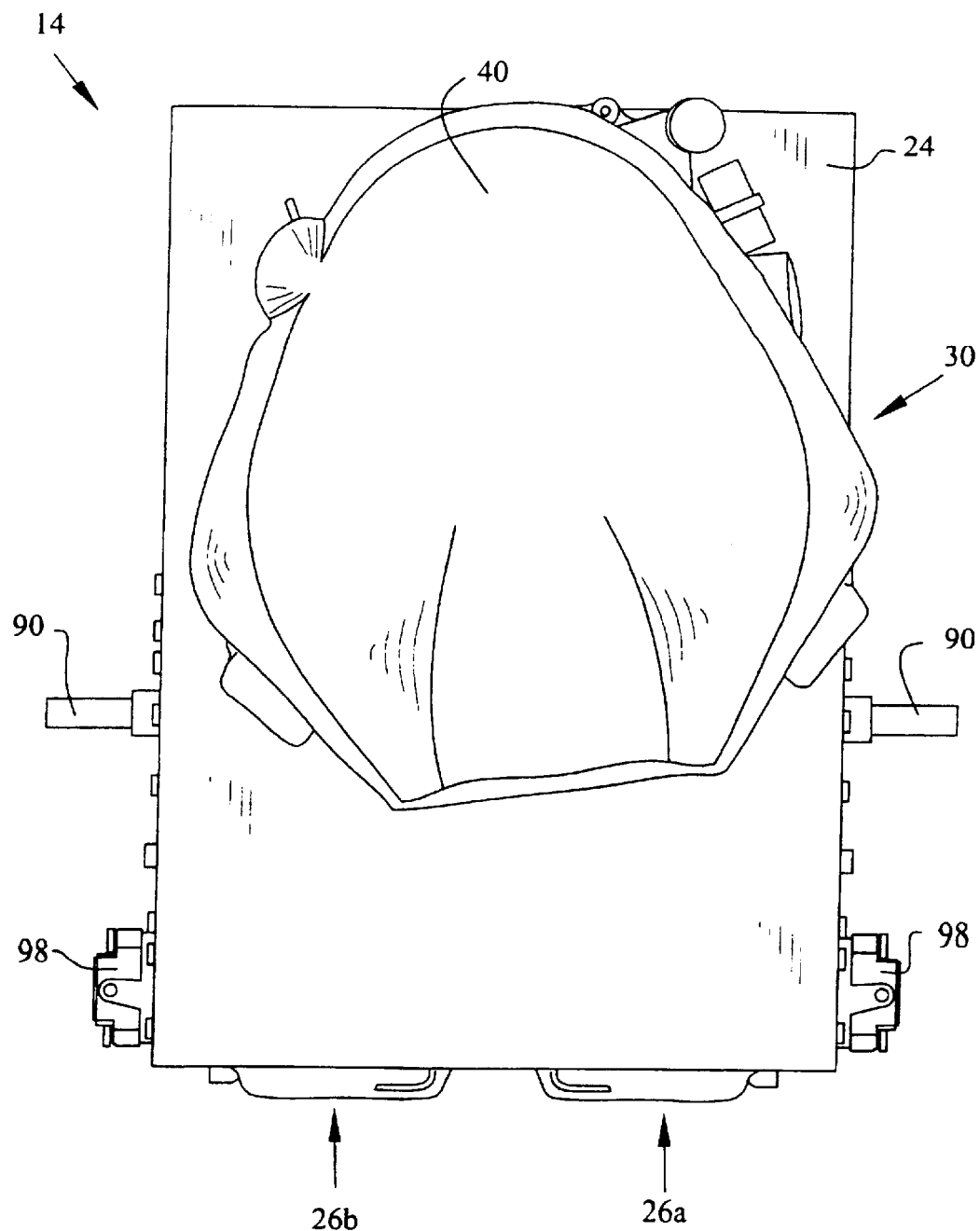
FIG. 3 is a top view of the powertrain module of FIG. 2.

Engine 30 is shown in FIGS. 1–3 as a V-twin, vertical crankshaft engine which generally includes crankcase 36, a pair of cylinder head portions, and shroud 40, which is disposed over a blower and flywheel assembly (not shown). However, the number and configuration of the cylinders of engine 30 may vary, such that engine 30 may alternatively be one of a number of different types of single or multi-cylinder engines. Crankcase 36 includes upper and lower crankcase halves 42, 44, shown in FIG. 2, with lower crankcase half 44 connected to an upper side of mounting plate 24 in a suitable manner. Referring to FIGS. 2 and 4, end 46 of the crankshaft of engine 30 extends through an aperture in mounting plate 24, and includes output pulley 48 (FIG. 2) affixed thereto, which is disposed beneath an underside of mounting plate 24 opposite engine 30. Drive member 50, shown in FIGS. 1 and 2 as an endless V-belt, is disposed in driving engagement around output pulley 48 of engine 30 as well as input pulleys 52a, 52b of hydrostatic transmission modules 26a, 26b, respectively, to thereby drive the pump units of hydrostatic transmission modules 26a, 26b from engine 30. Another output pulley (not shown) is also affixed to the engine crankshaft for powering the blades of the mower in any well-known manner.

Each hydrostatic transmission module 26a, 26b may be attached to a corresponding axle drive unit 28a, 28b such that the foregoing are packaged as a unit. Hydrostatic transmission modules 26a, 26b may be of the type disclosed in the above-incorporated U.S. Pat. No. 6,301,885 and U.S. patent applications Ser. Nos. 09/498,692 and 09/671,796. Each hydrostatic transmission module 26a, 26b is driven through rotating input shaft 54a, 54b on which are each rotatably fixed pulleys 52a, 52b, respectively, and fans 58. Fans 58 direct cooling air onto the exterior of transmission modules 26a, 26b. Transmission modules 26a, 26b are attached to axle drive units 28a, 28b by brackets 60, as best shown in FIG. 5.

Transmission modules 26a, 26b are attached to stamped metal brackets 60 by two or more bolts (not shown). Further, a torque strap (not shown) may be provided between mounting plate 24 and transmission modules 26a, 26b to counteract any tendency for transmission modules 26a, 26b to rotate about an axis parallel with axles 70, 72.

As described in the above-incorporated U.S. Pat. No. 6,301,885 and U.S. patent application Ser. Nos. 09/498,692 and 09/671,796, hydrostatic transmission modules 26a, 26b each include a variable displacement axial piston pump and a fixed displacement axial piston motor. The pump and motor of each module fluidly communicate through a pair of conduits, with the rotational direction of the motor, and hydrostatic transmission module's output shaft, being determined by which of these two conduits fluid flows from the pump to the motor. The speed at which the motor and the output shaft rotate is controlled by varying the pump displacement. The conduit chosen for fluid flow from the pump to the motor, and the displacement of the pump, are controlled by manipulation of a pivotable swash plate assembly through rotatable control shaft 61 (FIG. 6) in a well-known manner. Control shafts 61 may be separately linked to left and right-side, hand-operated control levers, for example, in the manner that hydrostatic pump displacement control means typically are.

Axle drive units 28a, 28b each include axle drive unit housing 62 having first portion 64 and second portion 66 which may both be made of stamped metal parts. Alternatively, housing second portion 66 may be a die cast aluminum part. Bracket 60 is affixed to housing portion 66 in any suitable manner, such as by tack welding or bolting. If housing second portion 66 is a casting, bracket 60 may be integrally formed thereon.

As may be seen in FIGS. 5 and 6, first and second portions 64, 66 of axle drive unit housings 62 are identical to one another, such that either a right or a left axle drive unit housing 62 may be formed by attaching second portion 66 to a selected one of the two opposite sides of first portion 64 by bolts 68. First portions 64 of axle drive unit housings 62 are attached to depending side portions 32 of mounting plate 24 by a plurality of bolts 69.

Figure 7:
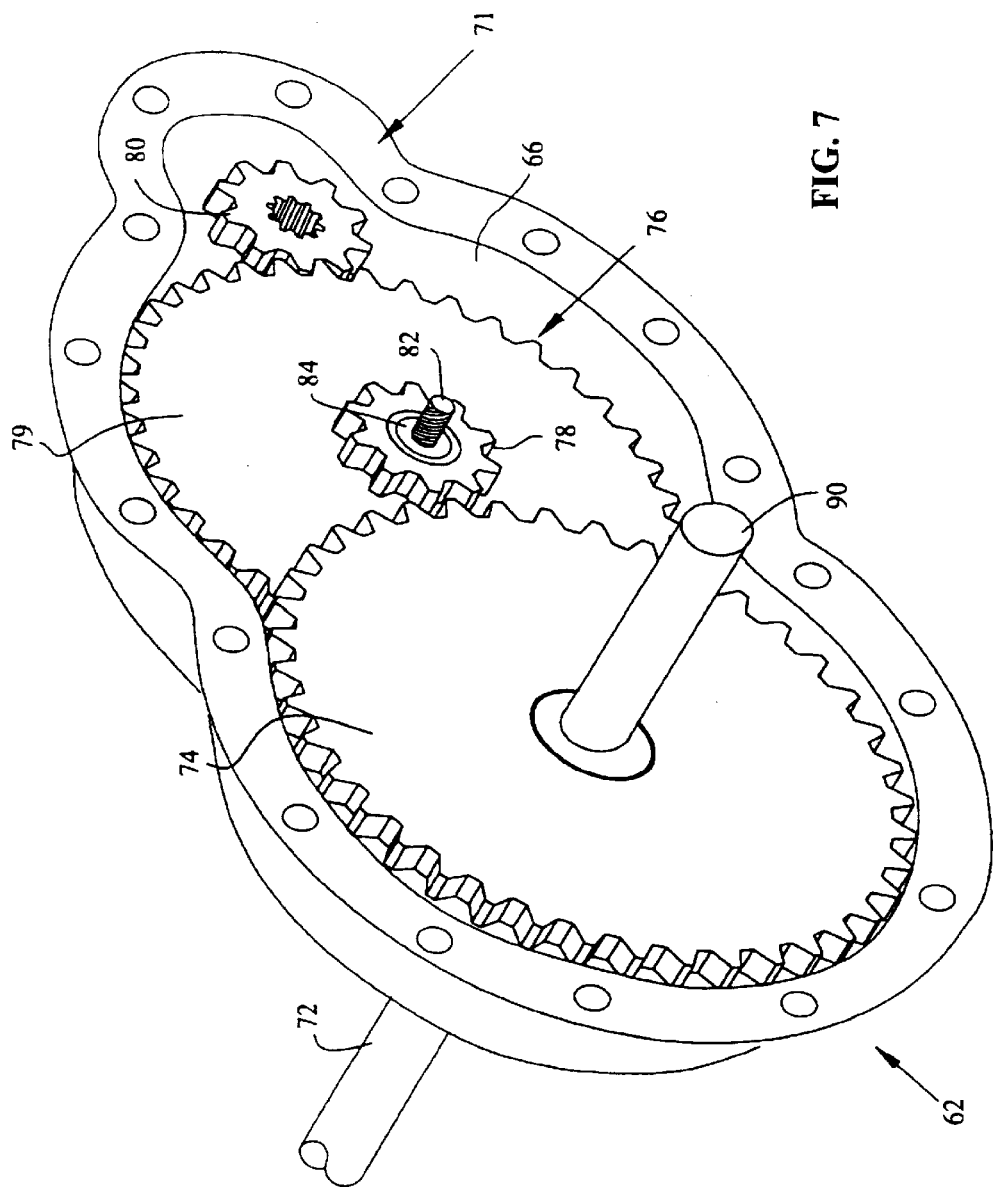
FIG. 7 is a perspective view of a portion of an axle drive unit with a portion of the axle drive unit housing removed to show the speed reduction gearing therein.

Referring to FIG. 7, each axle drive unit 28a, 28b includes gear train 71 disposed within each grease-filled drive axle unit housing 62. Gear train 71 includes large diameter output gear 74, compound idler gear 76 including integral small diameter gear portion 78 and larger diameter gear portion 79, and small diameter input gear 80. As shown, large diameter output gear 74 is intermeshed with small diameter gear portion 78 of compound idler gear 76, and larger diameter gear portion 78 of compound idler gear 76 is intermeshed with small diameter input gear 80. Compound idler gear 76 is rotatably disposed on enlarged diameter, central portion 84 of shouldered stud 82, which is provided with threaded portions at its axially opposite ends. The threaded portions of stud 82 extend through holes provided in first and second portions 64, 66 of axle drive unit housing 62 and are secured to housing 62 by nuts 86 (FIG. 6) threadedly engaged thereon. As shown, large diameter output gear 74 is splined to axle 72, and small diameter input gear 80 is splined to an output shaft (not shown) of hydrostatic transmission module 26b in a conventional manner.

Independently rotatable axles 70, 72 respectively extend from axle drive units 28a, 28b, and include inner ends which are independently rotatably disposed within bearing 92 supported by bearing support member 34 extending from the underside of mounting plate 24. Alternatively, the inner ends of the axles may be individually supported by separate bearings (not shown) supported by support member 24. Outer ends 90 of axles 70, 72 extend outwardly of axle drive units 28a, 28b, and, as shown in FIG. 1, ground-engaging wheels 94 may be mounted thereon in a conventional manner. The foregoing configuration of respective pairs of transmission modules 26a, 26b and axle drive units 28a, 28b is similar to that disclosed in U.S. patent application Ser. No. 10/124,182, filed Apr. 17, 2002, entitled "HYDROSTATIC TRANSAXLE".

Additionally, as shown in FIGS. 1 and 4–6, brake disks 96 are affixed to the outer ends 101 of the output shafts of transmission modules 26a, 26b, and may be allowed some axial movement along such output shafts as necessary. Brake disks 96 are engaged by brake assemblies 98, which are shown in FIGS. 2–6 attached to first portion 64 of axle drive unit housing 62, to apply braking force to the output shafts of transmission modules 26a, 26b. Brake assemblies 98 may be of the type disclosed in either of U.S. patent application Ser. Ser. Nos. 09/409,946, filed Sep. 30, 1999, and Ser. No. 09/512,161, filed Feb. 24, 2000, both assigned to Tecumseh Products Company, the disclosures of which are expressly incorporated herein by reference. Alternatively, brake assemblies 98 may be of the type disclosed in U.S. patent application Ser. No. 10/120,629, filed Apr. 11, 2002, entitled "BRAKE FOR A TRANSAXLE." Notably, instead of providing brake disks 96 on shafts directly driven by transmission modules 26a, 26b, brake disks 96 may alternatively be provided on outer ends 90 of axles 70, 72 inwardly of ground-engaging wheels 94, with brake assemblies 98 attached to first portion 64 of axle drive unit housings 62 at a location proximate brake disks 96 in order to apply braking force directly to axles 70, 72 via engagement with brake disks 96 thereon.

Further, axles 70, 72 may be selectively disconnected from their respective ground-engaging wheels 94, thereby allowing mower 10 to be easily pushed in the event of a transmission failure. Disengaging of a wheel from its respective axle may be done by any number of suitable, known ways.

While this invention has been described as having a particular design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A self-contained powertrain module, comprising:
   a structural member;
   an engine attached to said structural member, said engine including an output shaft;
   first and second hydrostatic transmission modules connected to said structural member, each said hydrostatic transmission module comprising a transmission housing, a rotating fluid pump disposed within said housing, and a rotatable fluid motor disposed within said housing and in fluid communication with said pump, said pump being driven by said engine output shaft and being of variable displacement, each said motor being rotated at various speeds and in forward and reverse directions in response to changes in pump displacement. the displacement of each said pump being variable independent of the displacement of the other said pump;
   first and second axle drive units connected to said structural member, each said axle drive unit comprising a housing and a speed reduction gear train disposed within said housing, each said speed reduction gear train having an input and an output, said first hydrostatic transmission module motor being operably coupled to said first axle drive unit gear train input, said second hydrostatic transmission module motor being operably coupled to said second axle drive unit gear train input; and
   first and second axles, said first axle being operably coupled to said first gear train output, said second axle being operably coupled to said second gear train output, said first and second axles respectively extending through said first and second axle drive unit housings.

2. The powertrain module of claim 1, further comprising a bearing supported by said structural member, said bearing supporting an end of a said axle.

3. The powertrain module of claim 1, wherein said first and second axles are coaxial.

4. The powertrain module of claim 1, wherein ends of said first and second axles are adjacent.

5. The powertrain module of claim 4, wherein said adjacent ends of said first and second axles abut.

6. The powertrain module of claim 4, further comprising a bearing supported by said structural member, said bearing rotatably supporting both of said adjacent ends of said first and second axles.

7. The powertrain module of claim 6, wherein said bearing is disposed between said first and second axle drive unit housings.

8. The powertrain module of claim 7, further comprising a support member extending from said structural member, said bearing being attached to said support member.

9. The powertrain module of claim 1, wherein said housings of said first and second axle drive units each comprise attached first and second portions, said first and second housing portions of said first and second drive units being respectively identical.

10. The powertrain module of claim 1, wherein said first and second hydrostatic transmission module pumps have an input shaft, said pump input shafts being coupled to said engine output shaft.

11. The powertrain module of claim 10, further comprising a pulley attached to said engine output shaft and to each of said pump input shafts, and a drive belt in driving engagement around said pulleys.

12. The powertrain module of claim 1, wherein said first and second hydrostatic transmission modules are mirror-images of one another.

13. The powertrain module of claim 1, wherein said structural member comprises a plate to which said engine and said first and second axle drive unit housings are fixed.

14. The powertrain module of claim 13, wherein said engine is disposed above said plate and said axle drive unit housings are disposed below said plate.

15. The powertrain module of claim 14, wherein said engine is located forwardly of said axles.

16. The powertrain module of claim 1, further comprising a brake mechanism attached to each of said first and second axle drive units.

17. In combination with the powertrain module of claim 1, a zero turn radius vehicle comprising a frame to which said support member is attached, and ground-engaging wheels attached to said first and second axles.

18. A self-contained powertrain module, comprising:
   a structural member;
   an engine attached to said structural member, said engine including an output shaft;
   first and second hydrostatic transmission modules connected to said structural member, each said hydrostatic transmission module comprising a transmission housing, a rotating fluid pump disposed within said housing, and a rotatable fluid motor disposed within said housing and in fluid communication with said pump, said pump being driven by said engine output shaft and being of variable displacement. each said motor being rotated at various speeds and in forward and reverse directions in response to changes in pump displacement;
   first and second axle drive units connected to said structural member, each said axle drive unit comprising a housing and a speed reduction gear train disposed within said housing, each said speed reduction gear train having an input and an output, said first hydrostatic transmission module motor being operably coupled to said first axle drive unit gear train input, said second hydrostatic transmission module motor being operably coupled to said second axle drive unit gear train input; and
   first and second axles, said first axle being operably coupled to said first gear train output, said second axle being operably coupled to said second gear train output, said first and second axles respectively extending through said first and second axle drive unit housings, wherein said first hydrostatic transmission module is connected to said structural member through said first axle drive unit, and said second hydrostatic transmission module is connected to said structural member through said second axle drive unit.

19. The powertrain module of claim 18, wherein said first hydrostatic transmission module is affixed to said first axle drive unit housing, and said second hydrostatic transmission module is affixed to said second axle drive unit.

20. The powertrain module of claim 18, wherein said structural member comprises a plate to which said engine and said first and second axle drive unit housings are fixed.

21. The powertrain module of claim 20, wherein said first and second axle drive unit housings each comprise attached first and second portions, each said first housing portion being substantially planar and affixed to said structural member.

22. In combination with the powertrain module of claim 18, a zero turn radius vehicle comprising a frame to which said support member is attached, and ground-engaging wheels attached to said first and second axles.

23. A self-contained powertrain module, comprising:

a structural member;

an engine attached to said structural member, said engine including an output shaft;

first and second hydrostatic transmission modules connected to said structural member, each said hydrostatic transmission module comprising a transmission housing, a rotating fluid pump disposed within said housing, and a rotatable fluid motor disposed within said housing and in fluid communication with said pump, said pump being driven by said engine output shaft and being of variable displacement, each said motor being rotated at various speeds and in forward and reverse directions in response to changes in pump displacement;

first and second axle drive units connected to said structural member, each said axle drive unit comprising a housing and a speed reduction gear train disposed within said housing, each said speed reduction gear train having an input and an output, said first hydrostatic transmission module motor being operably coupled to said first axle drive unit gear train input, said second hydrostatic transmission module motor being operably coupled to said second axle drive unit gear train input; and first and second axles, said first axle being operably coupled to said first gear train output, said second axle being operably coupled to said second gear train output, said first and second axles respectively extending through said first and second axle drive unit housings, wherein said first and second axle drive unit housings each comprise attached first and second portions, each said first housing portion being substantially planar and affixed to said structural member.

24. The powertrain module of claim 23, wherein said axle drive unit second housing portions are located between said axle drive unit first housing portions.

25. The powertrain module of claim 23, wherein each said axle drive unit housing first portions defines a cavity in which a said speed reduction gear train is disposed.

26. The powertrain module of claim 25, wherein said cavity is grease-filled.

27. The powertrain module of claim 25, wherein said axle drive unit second housing portions are metal stampings.

28. In combination with the powertrain module of claim 23, a zero turn radius vehicle comprising a frame to which said support member is attached, and ground-engaging wheels attached to said first and second axles.

29. A self-contained powertrain module, comprising:

a structural member;

an engine attached to said structural member, said engine including an output shaft;

first and second hydrostatic transmission modules connected to said structural member, each said hydrostatic transmission module comprising a transmission housing, a rotating fluid pump disposed within said housing, and a rotatable fluid motor disposed within said housing and in fluid communication with said pump, said pump being driven by said engine output shaft and being of variable displacement, each said motor being rotated at various speeds and in forward and reverse directions in response to changes in pump displacement;

first and second axle drive units connected to said structural member, each said axle drive unit comprising a housing and a speed reduction gear train disposed within said housing, each said speed reduction gear train having an input and an output, said first hydrostatic transmission module motor being operably coupled to said first axle drive unit gear train input, said second hydrostatic transmission module motor being operably coupled to said second axle drive unit gear train input; and first and second axles, said first axle being operably coupled to said first gear train output, said second axle being operably coupled to said second gear train output, said first and second axles respectively extending through said first and second axle drive unit housings, wherein each said fluid motor is provided with an output shaft, and further comprising a brake disk rotatably couple to and coaxial with said motor output shaft, said brake disk being selectively operatively engaged by a said brake mechanism.

30. The powertrain module of claim 29, wherein said motor output shafts are located rearwardly of said axles.

31. A zero turn radius vehicle, comprising:

a first frame portion;

a second frame portion comprising a powertrain module separably attached to said first frame portion and comprising:

a substantially rigid structural member attached to said first frame portion, an engine attached to said structural member, said engine having an output shaft, first and second hydrostatic transmission modules connected to said structural member, each said hydrostatic transmission module comprising: a transmission housing, a rotating fluid pump and a rotatable fluid motor disposed in said transmission housing, said pump connected in driving relationship with said engine output shaft, said motor being in fluid engagement with said pump, said pump being of variable displacement, each said motor being rotated at various speeds and in forward and reverse directions in response to changes in pump displacement, first and second axle drive units connected to said structural member, each including a housing and a speed reduction gear train disposed within said axle drive unit housing, each said speed reduction gear train having an input and an output, said first hydrostatic transmission module motor being operably coupled to said first axle drive unit gear train input, said second hydrostatic transmission module motor being operably coupled to said second axle, drive unit gear input, wherein said first hydrostatic transmission module is connected to said structural member through said first axle drive unit, and said second hydrostatic transmission module is connected to said structural member through said second axle drive unit; and first and second independently rotatable axles, said first axle being operably coupled to said first gear train output, said second axle being operably coupled to said second gear train output, said first and second axles respectively extending through said first and second axle drive unit housings; and a ground-engaging wheel attached to each said axle.

* * * * *

UNITED STATES PATENT AND TRADEMARK OFFICE
CERTIFICATE OF CORRECTION

PATENT NO. : 6,779,615 B2
DATED : August 24, 2004
INVENTOR(S) : Scott G. Boyer

It is certified that error appears in the above-identified patent and that said Letters Patent is hereby corrected as shown below:

Column 7,
Line 17, delete "." after "displacement" and substitute therefor -- , --.

Column 10,
Line 52, delete "," after "axle"

Signed and Sealed this

Twenty-sixth Day of October, 2004

JON W. DUDAS
*Director of the United States Patent and Trademark Office*